US010961922B2

United States Patent
Meisner et al.

(10) Patent No.: US 10,961,922 B2
(45) Date of Patent: Mar. 30, 2021

(54) SYSTEMS AND METHODS FOR POWER TURBINE GOVERNING

(71) Applicant: UNITED TECHNOLOGIES CORPORATION, Farmington, CT (US)

(72) Inventors: Richard P. Meisner, Glastonbury, CT (US); Chaohong Cai, Weatogue, CT (US); Timothy J. Crowley, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 262 days.

(21) Appl. No.: 15/945,556

(22) Filed: Apr. 4, 2018

(65) Prior Publication Data

US 2019/0309689 A1 Oct. 10, 2019

(51) Int. Cl.
*F02C 9/56* (2006.01)
*F02C 9/54* (2006.01)
*F02C 9/52* (2006.01)
*B64C 27/12* (2006.01)

(52) U.S. Cl.
CPC .............. *F02C 9/56* (2013.01); *F02C 9/52* (2013.01); *F02C 9/54* (2013.01); *B64C 27/12* (2013.01); *F05D 2220/329* (2013.01); *F05D 2270/02* (2013.01); *F05D 2270/03* (2013.01); *F05D 2270/052* (2013.01); *F05D 2270/304* (2013.01); *F05D 2270/309* (2013.01); *F05D 2270/44* (2013.01); *F05D 2270/702* (2013.01)

(58) Field of Classification Search
CPC ............... F02C 9/52; F02C 9/54; F02C 9/56
See application file for complete search history.

(56) References Cited

U.S. PATENT DOCUMENTS

| 4,807,129 A | 2/1989 | Perks |
| 5,189,620 A | 2/1993 | Parsons et al. |
| 6,729,139 B2 | 5/2004 | Desai et al. |
| 6,873,887 B2 | 3/2005 | Zagranski et al. |
| 8,594,904 B2 | 11/2013 | Livshiz et al. |
| 8,682,454 B2 | 3/2014 | Fuller et al. |
| 9,494,085 B2 | 11/2016 | Cai |
| 9,880,527 B2 | 1/2018 | Li et al. |
| 10,344,695 B1* | 7/2019 | Bergstedt ............ F02D 41/1402 |
| 2003/0094001 A1* | 5/2003 | Desai ..................... B64D 31/06 60/791 |
| 2003/0135305 A1* | 7/2003 | Zagranski ............... B64C 27/12 701/3 |

(Continued)

OTHER PUBLICATIONS

European Patent Office, European Search Report dated Jul. 31, 2019 in Application No. 19165602.4.

*Primary Examiner* — Imran K Mustafa
(74) *Attorney, Agent, or Firm* — Snell & Wilmer L.L.P.

(57) ABSTRACT

A power turbine control system for a gas turbine engine may comprise a controller comprising one or more processors in communication with the gas turbine engine. The processors may comprise an engine control module configured to receive a torque request signal and generate a torque achieved signal. A rate of change of power turbine speed estimation module may generate an estimated rate of change of power turbine speed signal. A dynamic inversion power turbine governor module may generate the torque request signal based on the torque achieved signal and estimated rate of change of power turbine speed signal.

14 Claims, 5 Drawing Sheets

(56) References Cited

U.S. PATENT DOCUMENTS

| | | |
|---|---|---|
| 2015/0113996 A1 | 4/2015 | Cai et al. |
| 2016/0069277 A1 | 3/2016 | Meisner et al. |
| 2016/0208717 A1* | 7/2016 | Cai .......................... F02C 9/54 |
| 2018/0030904 A1 | 2/2018 | Meunier |
| 2018/0073441 A1 | 3/2018 | Cai et al. |

* cited by examiner

SYSTEMS AND METHODS FOR POWER TURBINE GOVERNING

FIELD

The present disclosure relates generally to gas turbine engines, and more specifically, to systems and methods for controlling a power turbine of a gas turbine engine.

BACKGROUND

Turboshaft engines, a type of gas turbine engine typically used on helicopters, include a power turbine spool. The power turbine spool may comprise a power turbine that drives an external load, such as the main and tail rotors of a helicopter. Helicopter flight maneuvers, which may for example involve a change of main rotor collective pitch, may rapidly change the load or power demand on the power turbine. When delivering the requested change of power demand on the power turbine, it is desirable to maintain a generally constant rotor speed for better airframe handling qualities and reduced pilot workload.

SUMMARY

In various embodiments, the present disclosure provides a power turbine control system for a gas turbine engine. The power turbine control system may comprise a controller comprising one or more processors in communication with the gas turbine engine. The one or more processors may comprise an engine control module, a rate of change of power turbine speed estimation module, and a dynamic inversion power turbine governor (PTG) module. The engine control module may be configured to receive a torque request signal, determine at least one of a fuel flow, a guide vane schedule, or a bleed schedule based on the torque request signal, and generate a torque achieved signal based, at least in part, on the at least one of the fuel flow, the guide vane schedule, or the bleed schedule. The rate of change of power turbine speed estimation module may be configured to receive a power turbine speed signal and generate an estimated rate of change of power turbine speed signal. The dynamic inversion PTG module may be configured to receive the estimated rate of change of power turbine speed signal and generate the torque request signal using the estimated rate of change of power turbine speed signal and the torque achieved signal.

In various embodiments, the rate of change of power turbine speed estimation module may be configured to generate a model-based rate of change of power turbine speed signal, and The rate of change of power turbine speed estimation module may be configured to generate a sensor-based rate of change of power turbine speed signal.

In various embodiments, the power turbine control system of claim 2, wherein the rate of change of power turbine speed estimation module is configured such that the model-based rate of change of power turbine speed signal drives the estimated rate of change of power turbine speed signal during a transient state, and the sensor-based rate of change of power turbine speed signal drives the estimated rate of change of power turbine speed signal in steady state.

In various embodiments, the rate of change of power turbine speed estimation module may be configured to generate the model-based rate of change of power turbine speed signal based, at least in part, on the torque achieved signal generated by the engine control module.

In various embodiments, the rate of change of power turbine speed estimation module may be configured to generate the model-based rate of change of power turbine speed signal based, at least in part, on a torque load signal generated using pilot input.

In various embodiments, the dynamic inversion PTG module may be configured to determine a difference between a target power turbine speed signal and the power turbine speed signal, determine a desired rate of change of power turbine speed error signal based on the difference between the target power turbine speed signal and the power turbine speed signal, and determine a difference between the desired rate of change of power turbine speed error signal and the estimated rate of change of power turbine speed signal. In various embodiments, the dynamic inversion PTG module may configured to convert the difference between the desired rate of change of power turbine speed error signal and the estimated rate of change of power turbine speed signal to a torque request correction signal, and combine the torque request correction signal and the torque achieved signal to generate the torque request signal.

In various embodiments, the controller may be configured to control a torque of a power turbine of the gas turbine engine based, at least in part on, the at least one of the fuel flow, the guide vane schedule, or the bleed schedule.

Also disclosed herein is a method of controlling a power turbine. In accordance with various embodiments, the method may comprise receiving, by a controller, a torque request signal, and determining, by the controller, at least one of a fuel flow, a guide vane schedule, or a bleed schedule based on the torque request signal. The method may further comprise generating, by the controller, a torque achieved signal, generating, by the controller, an estimated rate of change of power turbine speed signal, and generating, by the controller, the torque request signal using the estimated rate of change of power turbine speed signal and the torque achieved signal.

In various embodiments, the controller may use inversion of a dynamic model to generate the torque achieved signal. In various embodiments, generating the estimated rate of change of power turbine speed signal may comprise generating a model-based rate of change of power turbine speed signal, and generating a sensor-based rate of change of power turbine speed signal using a power turbine speed.

In various embodiments, generating the model-based rate of change of power turbine speed signal may comprise determining a torque load signal based at least in part on real time pilot input, determining a difference between the torque achieved signal and the torque load signal, and converting the difference between the torque achieved signal and the torque load signal to the model-based rate of change of power turbine speed signal.

In various embodiments, generating the estimated rate of change of power turbine speed signal may further comprise inputting the model-based rate of change of power turbine speed signal and the sensor-based rate of change of power turbine speed signal into a fusion algorithms module. The fusion algorithms module may be configured such that the model-based rate of change of power turbine speed signal drives the estimated rate of change of power turbine speed signal during a transient state, and the sensor-based rate of change of power turbine speed signal drives the estimated rate of change of power turbine speed signal in steady state.

In various embodiments, generating the torque request signal may comprise receiving a target power turbine speed signal, determining a difference between the target power turbine speed signal and a power turbine speed signal, determining a desired rate of change of power turbine speed error signal based on the difference between the target power turbine speed signal and the power turbine speed signal, and determining a difference between the desired rate of change of power turbine speed error signal and the estimated rate of change of power turbine speed signal.

In various embodiments, generating the torque request signal may further comprise determining a torque request correction signal based on the difference between the desired rate of change of power turbine speed error signal and the estimated rate of change of power turbine speed signal, and combining the torque request correction signal and the torque achieved signal.

Also disclosed herein, in accordance with various embodiments, is a power turbine control system for a gas turbine engine, comprising a controller comprising one or more processors in communication with the gas turbine engine. The one or more processors may comprise an engine control module, a rate of change of power turbine speed estimation module, and a dynamic inversion PTG module. The engine control module may be configured to receive a torque request signal, and generate a torque achieved signal. The rate of change of power turbine speed estimation module may be configured to generate an estimated rate of change of power turbine speed signal. The dynamic inversion PTG module may be configured to generate the torque request signal based, at least in part, on the torque achieved signal and the estimated rate of change of power turbine speed signal.

In various embodiments, the rate of change of power turbine speed estimation module may be configured to generate a model-based rate of change of power turbine speed signal, and generate a sensor-based rate of change of power turbine speed signal. In various embodiments, the rate of change of power turbine speed estimation module may generate the estimated rate of change of power turbine speed signal using a complementary filter.

In various embodiments, the dynamic inversion PTG module may be configured to determine a difference between a target power turbine speed signal and a power turbine speed signal, determine a desired rate of change of power turbine speed error signal based on the difference between the target power turbine speed signal and the power turbine speed signal, and determine a difference between the desired rate of change of power turbine speed error signal and the estimated rate of change of power turbine speed signal.

In various embodiments, the dynamic inversion PTG module may be configured to determine a torque request correction signal based on the difference between the desired rate of change of power turbine speed error signal and the estimated rate of change of power turbine speed signal, and combine the torque request correction signal and the torque achieved signal to generate the torque request signal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101

Disclosed herein is a power turbine control system employing model-plus-feedback predictions. In various embodiments, an outer loop dynamic inversion PTG module calculates a desired power turbine speed derivative based on a speed error signal, and then determines a torque request correction to attain the desired speed derivative based on an estimated speed derivative free response. The torque request corrections may be accumulated with accommodation for operating at engine limits or effector saturation of the inner loop (i.e., engine control module), thereby preventing or reducing any windup of the torque request of the outer loop.

Figure 1:
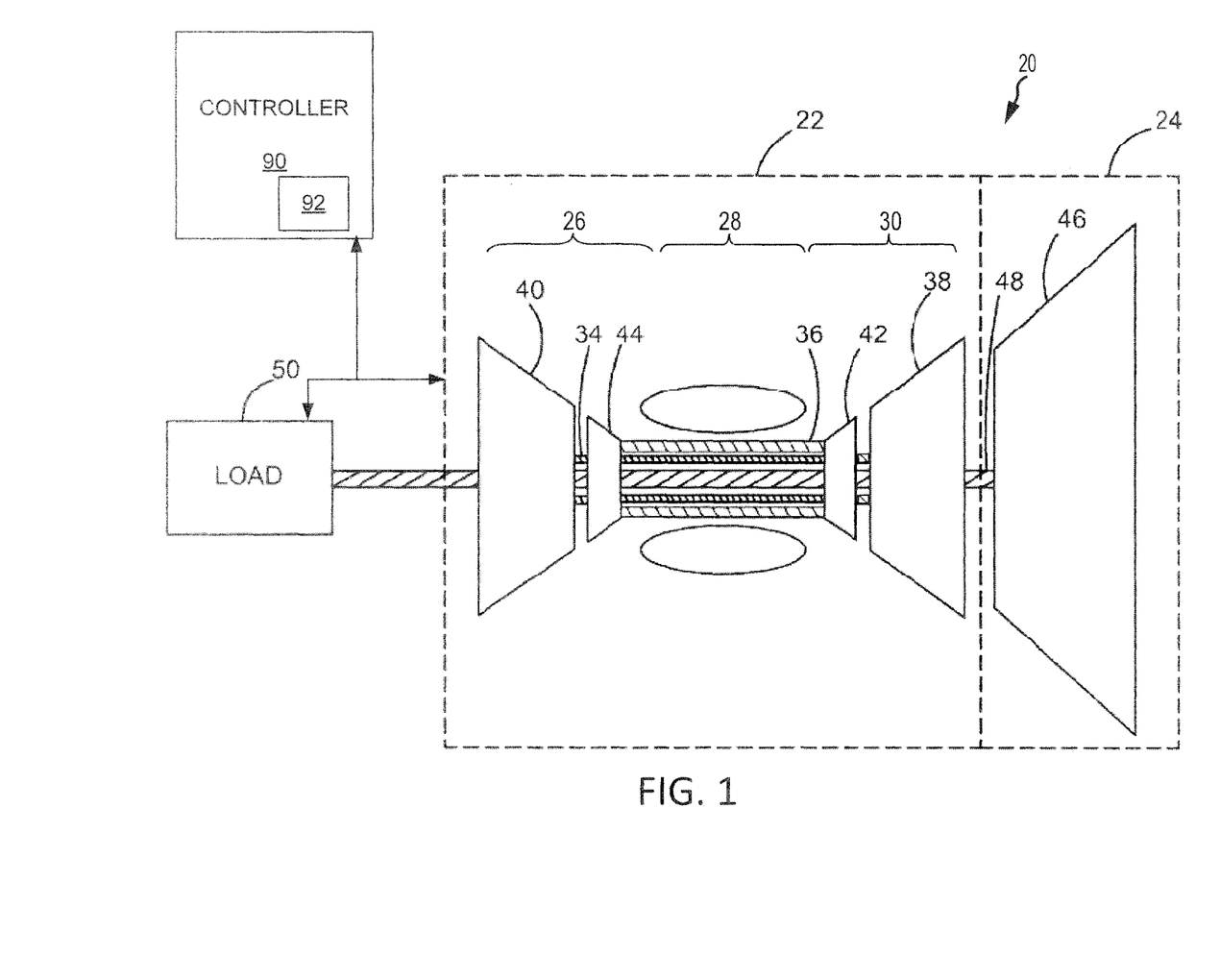
FIG. 1 illustrates a gas turbine engine, in accordance with various embodiments.

Referring to FIG. 1, an exemplary gas turbine engine 20 is shown, in accordance with various embodiments. In various embodiments, gas turbine engine 20 may be a turboshaft engine. Gas turbine engine 20 may generally comprise a gas generator section 22 and a power turbine section 24. The gas generator section 22 may include a compressor section 26 where air is pressurized, a combustor section 28 downstream of the compressor section and wherein the compressed air is mixed with fuel and ignited to generate hot combustion gases, and a turbine section 30 downstream of the combustor section 28 for extracting power from the hot combustion gases.

In various embodiments, gas generator section 22 may comprise a two-spool configuration, particularly, a low spool 34 and a high spool 36. Mounted to the low spool 34 is a low pressure turbine 38 which drives a low pressure compressor 40. Mounted to the high spool 36 is a high pressure turbine 42 which drives a high pressure compressor 44. As used herein, a "high pressure" compressor or turbine experiences a higher pressure than a corresponding "low pressure" compressor or turbine during operation. While two spools are illustrated, it should be understood that greater or fewer than two spools may be used in the gas generator section 22.

Power turbine section 24 comprises a power turbine 46 mounted to a power turbine spool 48. In operation, gas generator section 22 generates combustion gas that imparts torque to power turbine spool 48 through power turbine 46. Power turbine spool 48 may drive a load 50, such as, without limitation, a rotor, a turbo-pump, an electrical generator, a propeller, or other load. In various embodiments, a gear box may multiply the torque or power provided from power turbine spool 48 to load 50.

Gas turbine engine 20 and load 50 may be in communication with a controller 90 configured to control gas turbine engine 20. In various embodiments, controller 90 may comprise a full authority digital engine control (FADEC) system. Controller 90 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Controller 90 may include a memory 92, which may store executable instructions and data to implement control logic of controller 90. Memory 92 may comprise a tangible, non-transitory storage medium and may store data used, for example, for engine operation control and engine prognosis purposes.

Figure 2:
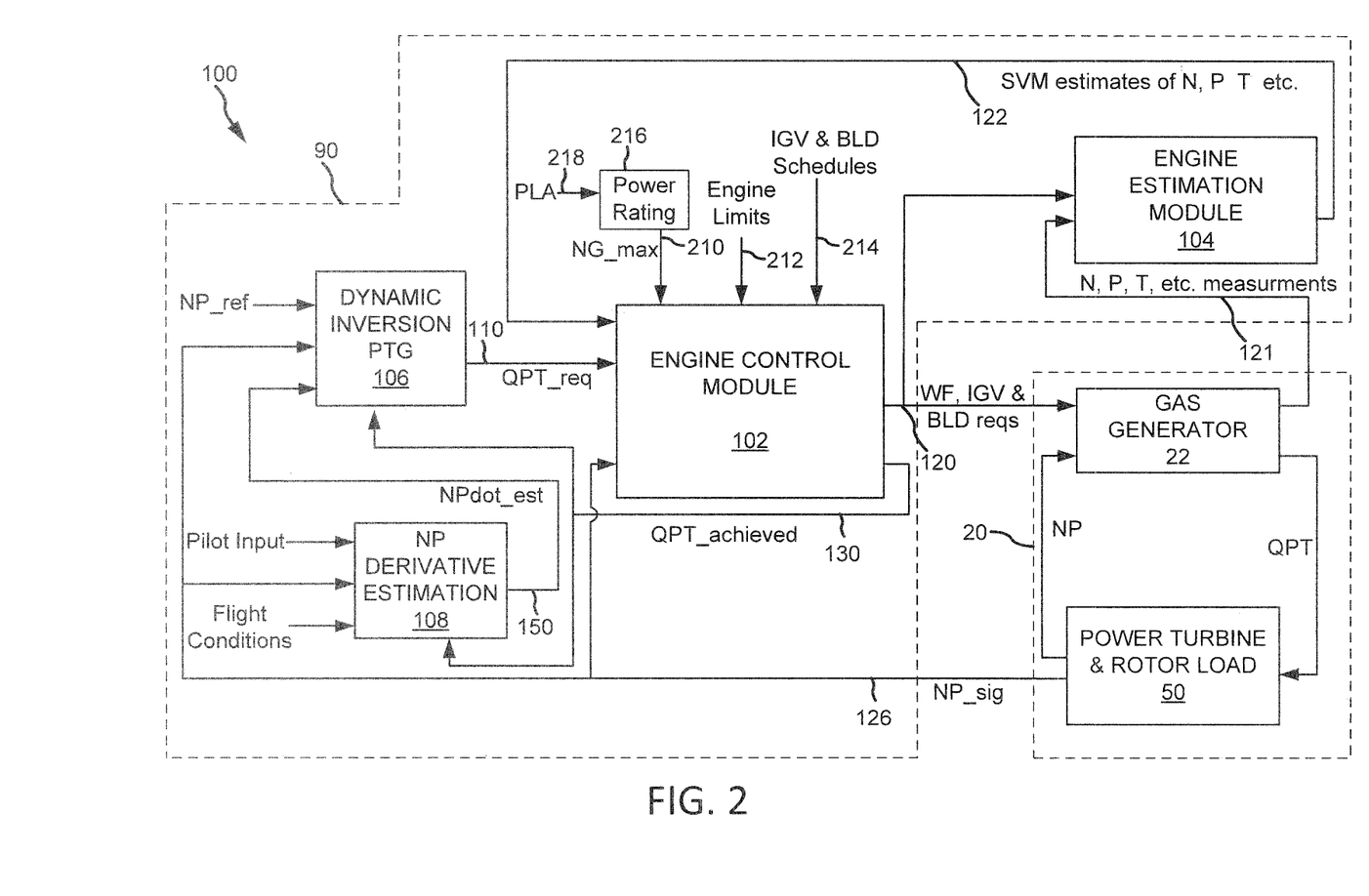
FIG. 2 illustrates a schematic representation of a power turbine control system for a gas turbine engine, in accordance with various embodiments.

Referring now to FIG. 2, with continued reference to FIG. 1, a power turbine control system 100 for gas turbine engine 20 is shown, in accordance with various embodiments. Power turbine control system 100 may include controller 90. Controller 90 comprises one or more processors which may include an engine control module 102, an engine estimation module 104, a dynamic inversion PTG module 106, and a rate of change of power turbine speed estimation (NP derivative estimation) module 108. In various embodiments, dynamic inversion PTG module 106 and NP derivative estimation module 108 may form an outer loop of power turbine control system 100, configured to determine an amount power turbine torque needed to maintain a generally constant rotor speed based on an estimated rate of change in power turbine speed (NPdot). Dynamic inversion PTG module 106 may output a torque request signal (QPT_req) 110 indicative on the amount of torque needed to maintain rotor speed to an inner loop of power turbine control system 100. In various embodiments, engine control module 102 and engine estimation module 104 form the inner loop of power turbine control system 100, and are configured to receive the QPT_req 110 and determine a fuel flow (WF), inlet guide vane (IGV) schedule, and/or stability bleed (BLD) schedule for gas generator section 22 based, at least in part, on the QPT_req 110. Controller 90 (e.g., engine control module 102) may be configured to control a torque of power turbine 46 according to the determined WF, IGV schedules, and/or BLD schedules.

Power turbine control system 100 is in communication with the gas turbine engine 20 and load 50 (e.g., with control units and/or sensors of gas generator section 22, power turbine section 24, and/or load 50). In this regard, engine control module 102, engine estimation module 104, dynamic inversion PTG module 106, and/or NP derivative estimation module 108 may receive and interpret data from one or more sensors coupled to gas generator section 22, power turbine section 24, and load 50. The sensors may generate signals indicative of operating parameters, such as, without limitation, real-time power turbine speed (NP), real-time power turbine torque (QPT), real-time engine state variables speed (N), pressure (P), temperature (T), thrust (F)), real-time speed of high spool 36 (NH), and/or real-time speed of low spool 34 (NL).

Power turbine control system 100 may be configured to output engine command signals 120 to one or more components of gas turbine engine 20. In various embodiments, engine control module 102 may output engine command signals 120 configured to modulate fuel flow (WF), inlet guide vane (IGV) schedules, and stability bleed (BLD) schedules. For example, engine command signals 120 may be output to one or more control units (e.g., actuators) of gas generator section 22.

Dynamic inversion PTG module 106 and engine control module 102 may create a cascaded architecture of power turbine control system 100 to manage power demand of gas generator section 22 and load 50. In various embodiments, load 50 is a combination of power turbine 46 and a main rotor of the helicopter, although other loads are certainly possible. Gas generator section 22 and load 50 are also in communication with each other. NP derivative estimation module 108 may be in communication with dynamic inversion PTG module 106, engine control module 102, gas generator section 22, and load 50.

Engine control module 102 may be in communication with engine estimation module 104. Engine estimation module 104 may receive engine state measurements 121 (e.g., N, P, T, etc. measurements) output from sensors of gas turbine engine 20. Engine estimation module 104 may also receive engine command signals 120 (i.e., WF, IGV & BLD reqs) output from engine control module 102. Engine estimation module 104 outputs support vector machine (SVM) estimates of N, P, T, QPT, etc., 122 based, at least in part, on the engine state measurements 121 and engine command signals 120. As discussed in further detail below, engine control module 102 may use the output of engine estimation module 104, along with the QPT_req 110 output from dynamic inversion PTG module 106, engine limits 212, and other variable inputs, to determine an estimate of the torque achieved by power turbine 46. Engine control module 102 outputs a torque achieved signal (QPT_achieved) 130 indicative of the estimated torque achieved by power turbine 46. QPT_achieved 130 may be output to dynamic inversion PTG module 106 and NP derivative estimation module 108.

Figure 3:
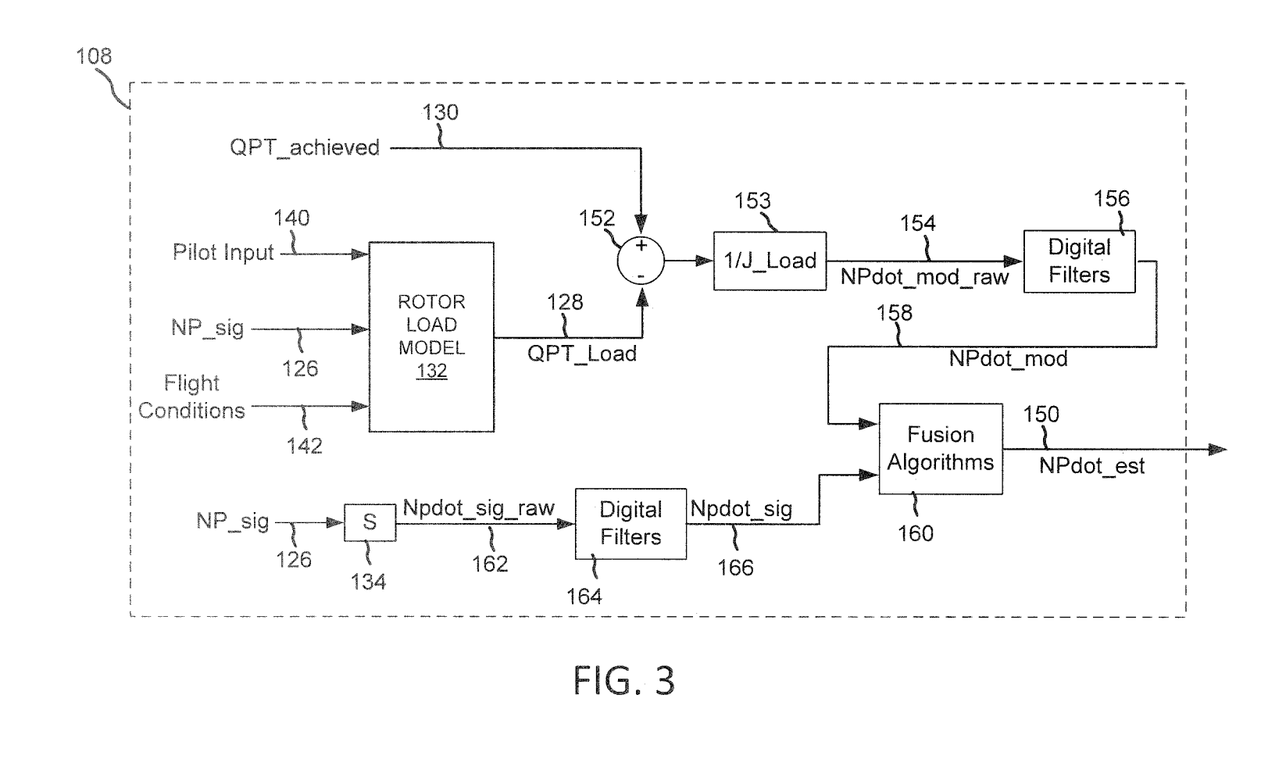
FIG. 3 illustrates a schematic representation of a rate of change of power turbine speed estimation module, in accordance with various embodiments.

Referring now to FIG. 3, with continued reference to FIG. 1 and FIG. 2, NP derivative estimation module 108 may be configured to estimate a rate of change of power turbine speed (NPdot) using QPT_achieved 130, a real-time power turbine speed signal (NP_sig) 126 output from, for example, a sensor configured to determine the speed of power turbine 46, and an estimated power turbine torque load signal (QPT_Load) 128. NP derivative estimation module 108 outputs an estimate a rate of change of power turbine speed signal NPdot_est 150 indicative of an estimated rate of change in speed of power turbine 46, which may be used by PTG module 106 to produce QPT_req 110.

In various embodiments, NPdot_est 150 is a model-plus-feedback based prediction. NP derivative estimation module 108 may receive a real-time pilot input 140 (e.g., collective lever (C/L) angle), real-time NP_sig 126, and real-time flight condition data 142 (e.g., data corresponding to pressure, temperature, altitude, etc.). NP derivative estimation module 108 may input pilot input 140, real-time NP_sig 126, and real-time flight condition data 142 into a rotor load model 132 to estimate QPT_Load 128. Stated differently, NP derivative estimation module 108 may use rotor load model 132 to determine QPT_Load 128 based on real time pilot inputs 140, real-time NP_sig 126, and real-time flight condition data 142. NP derivative estimation module 108 may then determine a difference between QPT_Load 128 and QPT_achieved 130 at a summing node 152.

NP derivative estimation module 108 shay then convert the difference between QPT_achieved 130 and QPT_Load 128 to a rate of change of power turbine speed signal NPdot_sig_raw 154. Stated differently, the output of node 152 may be input into a convertor 153 configured to convert power turbine torque to a rate of change of power turbine speed. The output NPdot_mod_raw 154 of convertor 153 may be input into one or more digital filter(s) 156 for signal processing. Digital filters 156 may comprise notch, band-stop, high pass, and/or low pass filters. The output (NPdot_mod 158) of digital filters 156 may be input into a fusion algorithms module 160.

NPdot_mod 158 represents a model-based estimation signal for NPdot (i.e., an estimated rate of change of power turbine speed signal that is model-based). Fusion algorithms module 160 also receives a sensor-based NPdot estimation. For example, in various embodiments, NP derivative estimation module 108 may use real-time NP_sig 126 and a differentiator 134 to determine a sensor-based a NPdot_sig_raw 162. Stated differently, differentiator 134 may receive real-time NP_sig 126 and output NPdot_sig_raw 162. NPdot_sig_raw 162 is input into one or more digital filter(s) 164. Digital filters 164 may comprise notch, band-stop, high pass, and/or low pass filters. The output NPdot_sig 166 of digital filters 164 may be input into fusion algorithms module 160.

Fusion algorithms module 160 may use a complementary filter, Kalman filter, Bayesian estimation algorithm, or the like to generate NPdot_est 150. In various embodiments, fusion algorithms module 160 is configured such that in steady state conditions, or at low frequencies, sensor-based NPdot_sig 166 propagates through and drives NPdot_est 150. And in a transient state, or at high frequencies, much of sensor-based NPdot_sig 166 signal may be blocked or canceled, such that NPdot_est 150 is dominated by model-based NPdot_mod 158. In other words, in transient states, NPdot_est 150 may be a predominantly model-based signal, and during steady state NPdot_est 150 may be a predominately sensor-based signal.

NP derivative estimation module 108 may allow power turbine control system 100 to respond rapidly to load changes. For example, if an operator (e.g., pilot) changes collective pitch (e.g., by applying load), causing an increase in QPT_Load 128, a negative model-based NPdot_mod 158 may be generated. The negative model-based NPdot_mod_raw 154 may be generated before real-time NP_sig 126 generates a negative signal corresponding to the change of collective pitch. The negative model-based NPdot_mod 158 may drive NPdot_est 150, thereby generating an increased QPT_req 110 output from dynamic inversion PTG module 106. In this regard, the model-based NPdot_mod 158 may anticipate a potential droop before it is conveyed by real-time NP_sig 126. NP derivative estimation module 108 also allows power turbine control system 100 to reduce error, or bias, that may be generated using model based system integration. For example, in steady state, bias may be reduced from NPdot_est 150, as NPdot_est 150 will be dominated by sensor-based NPdot_sig 166. In this regard, at high frequency, or in transient state, the model-based NPdot_mod 158 provides anticipation, and at low frequency, or in steady state, any model bias is reduced by using the sensor-based NPdot_sig 166 (as opposed to a solely modeled-based NPdot), to generate NPdot_est 150 and the resulting QPT_req 110.

Figure 4:
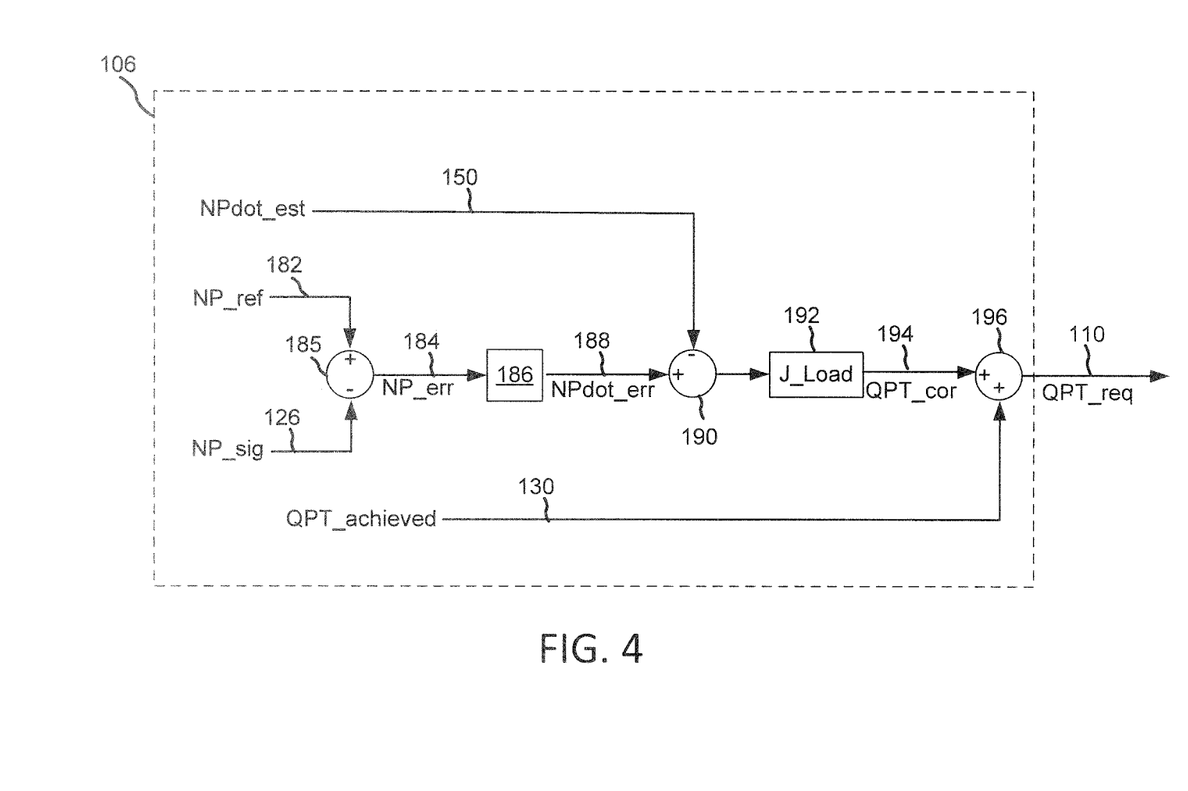
FIG. 4 illustrates a schematic representation of dynamic inversion PTG module, in accordance with various embodiments.

Referring now to FIG. 4, with continued reference to FIG. 1 and FIG. 2, power turbine control system 100 may then use a dynamic inversion PTG module 106 to generate a QPT_req 110 based on QPT_achieved 130, a desired power turbine speed (NP_ref) 182, real-time NP_sig 126, and NPdot_est 150. Dynamic inversion PTG module 106 may be configured to maintain power turbine 46 at a same or similar rotor speed and/or power turbine speed. Dynamic inversion PTG module may then output the QPT_req 180 to engine control module 102.

In order to generate QPT_req 110, dynamic inversion PTG module 106 may employ a dynamic inversion model. In various embodiments, QPT_req 110 is a model-plus-feedback based prediction. Dynamic inversion PTG module 106 may receive NP_ref 182 from, for example, a cockpit or avionics unit of the aircraft. Dynamic inversion PTG module 106 may determine a difference (NP_err 184) between NP_ref 182 and real-time speed NP_sig 126 at a summing node 185. NP_err 184 may be input into a convertor 186. Convertor 186 may be configured to covert NP_err 184 to a desired rate of change of power turbine speed error signal (NPdot_err) 188 (i.e., convert speed to rate of change in speed). Dynamic inversion PTG module 106 may then determine a difference between NPdot_est 150 and NPdot_err 188 at a summing node 190. A converter 192 that may be derived from total load inertia may receive the signal output from summing node 190. Converter 192 may convert the signal received from summing node 190 to a power turbine torque correction signal (QPT_cor) 194 (i.e., convert rate of change in speed to torque). The signal output from converter 192 may then be combined with QPT_achieved 130 at a summing node 196 to generate QPT_req 110.

Figure 5:
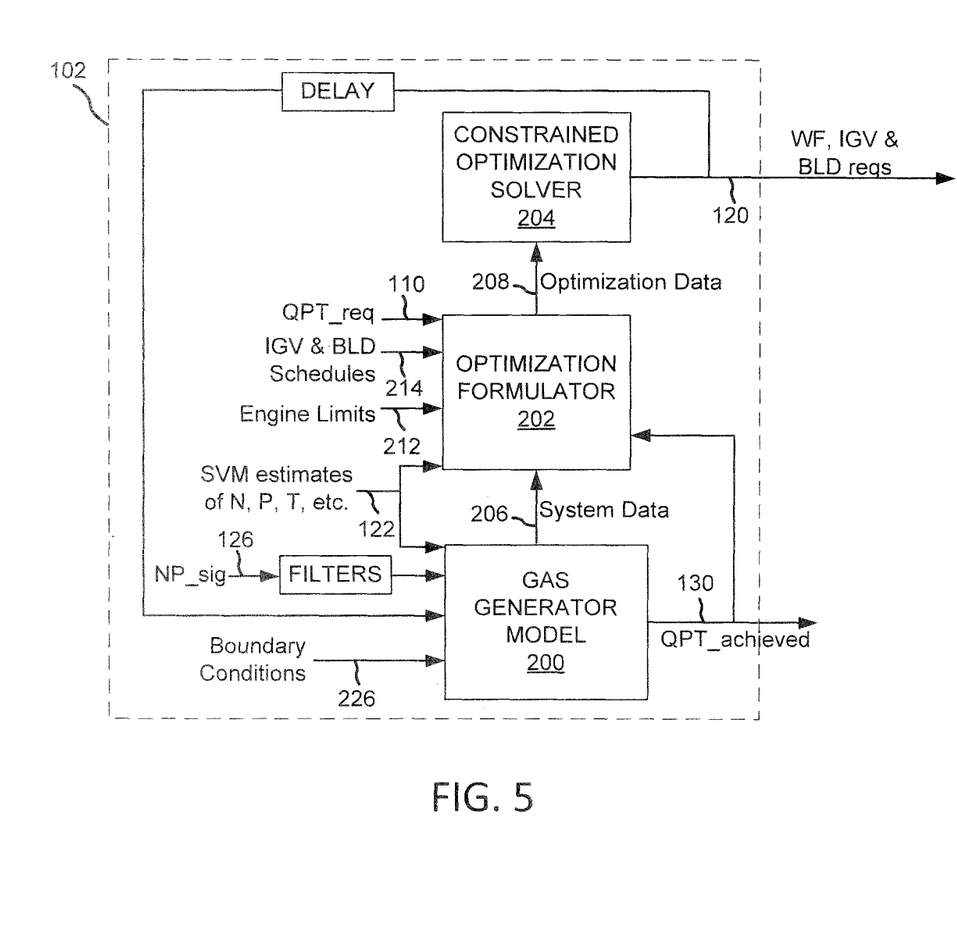
FIG. 5 illustrates a schematic representation of an engine control module, in accordance with various embodiments.

Referring now to FIG. 5, with continued reference to FIG. 1 and FIG. 2, engine control module 102 may determine QPT_achieved 130 based, at least in part, on QPT_req 110 received from dynamic inversion PTG module 106. In various embodiments, engine control module 102 employs a dynamic inversion model to determine QPT_achieved 130. In various embodiments, engine control module 102 is configured to receive QPT_req 110, SVM estimates of N, P, T, etc. output from engine estimation module 104, effector command signals and/or engine measurement or feedback signals 120 (e.g. WF, IGV, BLD, etc.), and engine and operating data, such as, for example, signals indicative of gas generator speed maximum limit (NG_max) 210, gas turbine engine limits 212, and IGV and BLD schedules 214. In various embodiments, NG_max signal 210 may be output from a power rating module 216. Power rating module 216 may be configured to receive a power lever angle (PLA) command signal 218, which may be used to generate NG_max signal 210. Gas generator speed control is generally a function of PLA. In this regard, in various embodiments, power rating module 216 may utilize tables to generate NG_max signal 210 based on PLA command signal 218.

Based, at least in part, on the received signals, engine control module 102 determines WF, IGV schedules, and BLD schedules of the gas generator section 22 that will generate the torque corresponding to the QPT_req 110 output from dynamic inversion PTG module 106. In this regard, engine control module 102 may manage multivariable controls of the gas generator section 22 to quickly respond to power demand changes. Engine command signals 120 indicative of the determined WF, IGV schedules, and BLD schedules may be output to gas generator section 22 of the gas turbine engine 20. The fuel flow, inlet guide vane positions, and stability bleed valves of gas generator section 22 may then be adjusted according to the engine command signals 120 (i.e., WF, IGV & BLD reqs) output from engine control module 102.

In various embodiments, engine control module 102 may employ an inversion of a dynamic model to generate engine command signals 120 (i.e., WF, IGV & BLD reqs). For example, as shown in FIG. 5, engine control module 102 may include a gas generator model 200, an optimization formulator 202, and a constrained optimization solver 204. Gas generator model 200 may describe dynamic behavior of gas generator section 22. Gas generator model 200 may be a linear or nonlinear (e.g., differential algebraic equations, possibly in numerical simulation form), physics and data-based model based, at least in part, on the real-time NP_sig 126, engine command signals 120, and one or more engine boundary conditions 226 (e.g., inlet pressure, inlet temperature, altitude, Mach number, etc.).

Optimization formulator 202 may receive input data related to system model data 206 from the gas generator model 200, QPT_req 110 from dynamic inversion PTG module 106, engine limits 212, IGV and BUD schedules 214, SVM estimates of N, P, T, etc. 122, and QPT_achieved 130, Based on the various input data, optimization formulator 202 may formulate an optimization problem for which optimization software will be able to solve as a numerically iterative process in real-time. Constrained optimization solver 204 may receive optimization data 208 from the optimization formulator 202 in order to generate engine command signals 120, for example fuel flow, inlet guide vane schedules, and stability bleed schedules command signals (WE, IGV & BLD reqs). Constrained optimization solver 204 may be a numerical iteration tool which finds a solution to the optimization problem formulated by optimization formulator 202.

Constrained optimization solver 204 may be constrained to engine limits 212 of the gas turbine engine 20, such as, without limitation, a rotor speed limit, a compressor stall limit, a lean blowout limit, a temperature limit, a pressure limit, or the like. Real-time implementation of the constrained, inverted dynamic gas generator model 200 into engine control module 102 generates values for fuel flow, inlet guide vane schedules, and stability bleed schedules that deliver a torque of the power turbine section 24 that is proximate or equal to QPT_req 110, but also within the limits of the gas turbine engine 20. In this regard, dynamic inversion PTG module 106 and engine control module 102 may be coordinated such that, if an engine limit 212 causes engine control module 102 to reduce the amount of torque generated by power turbine 46 (i.e., QPT_achieved 130 is less than QPT_req 110), dynamic inversion PTG module 106 generates the next QPT_req 110 based on the actual (i.e., achieved) torque of power turbine 46 to prevent wind-up of the torque requests from the outer loop. Stated differently, the gas generator model 200 predicts the actual torque achieved (QPT_achieved 130), which is then used by NP derivative estimation module 108 and dynamic inversion PTG module 106 to generate QPT_req 110. In this regard, if engine limits 212 do not affect engine command signals 120, QPT_achieved 130 will be approximately equal to QPT_req 110. If engine limits 212 cause a reduction in the actual amount of torque achieved by power turbine 46, QPT_achieved 130 will be less than QPT_req 110. Employing QPT_achieved 130, as opposed to a previously generated QPT_req 110, to generate each new QPT_req 110 tends to reduce wind-up of QPT_req 110 (generating too large a QPT_req 110). The coordination between dynamic inversion PTG module 106 and engine control module 102 may avoid or reduce sluggish response and/or NP overshoot, which can result from wind-up of QPT_req 110, while extracting a full capability of engine control module 102 and gas generator section 22 to deliver power to meet rotor system needs with increased precision.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power turbine control system for a gas turbine engine, comprising:
  a controller comprising one or more processors in communication with the gas turbine engine, the one or more processors comprising:
    an engine control module configured to:
      receive a torque request signal,
      determine at least one of a fuel flow, a guide vane schedule, or a bleed schedule based on the torque request signal, and
      generate a torque achieved signal based, at least in part, on the at least one of the fuel flow, the guide vane schedule, or the bleed schedule;
    a rate of change of power turbine speed estimation module configured to receive a power turbine speed signal and the torque achieved signal, wherein the rate of change of power turbine speed estimation module is configured to generate an estimated rate of change of power turbine speed signal based on the power turbine speed signal, the torque achieved signal, and an estimated power turbine torque load signal; and
    a dynamic inversion power turbine governor module configured to receive the estimated rate of change of power turbine speed signal and the torque achieved signal, wherein the dynamic inversion power turbine governor module is configured to:
      receive a target power turbine speed signal,
      determine a desired rate of change of power turbine speed error signal based on a difference between the target power turbine speed signal and the power turbine speed signal,
      determine a difference between the desired rate of change of power turbine speed error signal and the estimated rate of change of power turbine speed signal, and
      generate the torque request signal using the torque achieved signal and the difference between the desired rate of change of power turbine speed error signal and the estimated rate of change of power turbine speed signal.

2. The power turbine control system of claim 1, wherein the rate of change of power turbine speed estimation module is configured to:
  generate a model-based rate of change of power turbine speed signal; and
  generate a sensor-based rate of change of power turbine speed signal.

3. The power turbine control system of claim 2, wherein the rate of change of power turbine speed estimation module is configured such that the model-based rate of change of power turbine speed signal drives the estimated rate of change of power turbine speed signal during a transient state, and the sensor-based rate of change of power turbine speed signal drives the estimated rate of change of power turbine speed signal in steady state.

4. The power turbine control system of claim 2, wherein the rate of change of power turbine speed estimation module is configured to generate the model-based rate of change of power turbine speed signal based, at least in part, on the torque achieved signal generated by the engine control module and the estimated power turbine torque load signal.

5. The power turbine control system of claim 4, wherein the estimated power turbine torque load signal is generated using a pilot input.

6. The power turbine control system of claim 1, wherein the dynamic inversion power turbine governor module is configured to:
  determine a torque request correction signal based on the difference between the desired rate of change of power turbine speed error signal and the estimated rate of change of power turbine speed signal; and
  combine the torque request correction signal and the torque achieved signal to generate the torque request signal.

7. The power turbine control system of claim 1, wherein the controller is configured to control a torque of a power turbine of the gas turbine engine based, at least in part, on the at least one of the fuel flow, the guide vane schedule, or the bleed schedule.

8. The power turbine control system of claim 1, wherein the rate of change of power turbine speed estimation module generates the estimated rate of change of power turbine speed signal using a complementary filter.

9. A method of controlling a power turbine, comprising:
  receiving, by an engine control module of a controller, a torque request signal;
  determining, by the engine control module, at least one of a fuel flow, a guide vane schedule, or a bleed schedule based on the torque request signal;
  generating, by the engine control module, a torque achieved signal using the at least one of the fuel flow, the guide vane schedule, or the bleed schedule;
  receiving, by a rate of change of power turbine speed estimation module of the controller, a power turbine speed signal and the torque achieved signal;
  generating, by the rate of change of power turbine speed estimation module, an estimated rate of change of power turbine speed signal based on the power turbine speed signal, the torque achieved signal, and an estimated power turbine torque load signal;
  receiving, by a dynamic inversion power turbine governor module of the controller, the estimated rate of change of power turbine speed signal and the torque achieved signal;
  receiving, by the dynamic inversion power turbine governor module, a target power turbine speed signal;

determining, by the dynamic inversion power turbine governor module, a desired rate of change of power turbine speed error signal based on a difference between the target power turbine speed signal and the power turbine speed signal;

determining, by the dynamic inversion power turbine governor module, a difference between the desired rate of change of power turbine speed error signal and the estimated rate of change of power turbine speed signal; and generating, by the dynamic inversion power turbine governor module, the torque request signal using the torque achieved signal and the difference between the desired rate of change of power turbine speed error signal and the estimated rate of change of power turbine speed signal.

10. The method of claim 9, wherein the engine control module of the controller uses inversion of a dynamic model to generate the torque achieved signal.

11. The method of claim 9, wherein generating, by the rate of change of power turbine speed estimation module, the estimated rate of change of power turbine speed signal comprises:

generating, by the rate of change of power turbine speed estimation module, a model-based rate of change of power turbine speed signal; and generating, by the rate of change of power turbine speed estimation module, a sensor-based rate of change of power turbine speed signal using the power turbine speed signal.

12. The method of claim 11, wherein generating, by the rate of change of power turbine speed estimation module, the model-based rate of change of power turbine speed signal comprises:

determining, by the rate of change of power turbine speed estimation module, the estimated power turbine torque load signal based, at least in part, on pilot input;

determining, by the rate of change of power turbine speed estimation module, a difference between the torque achieved signal and the estimated power turbine torque load signal; and converting, by the controller, the difference between the torque achieved signal and the estimated power turbine torque load signal to the model-based rate of change of power turbine speed signal.

13. The method of claim 11, wherein generating, by the rate of change of power turbine speed estimation module, the estimated rate of change of power turbine speed signal further comprises:

inputting, by the rate of change of power turbine speed estimation module, the model-based rate of change of power turbine speed signal into a fusion algorithms module; and inputting, by the rate of change of power turbine speed estimation module, the sensor-based rate of change of power turbine speed signal into the fusion algorithms module, wherein the fusion algorithms module is configured such that the model-based rate of change of power turbine speed signal drives the estimated rate of change of power turbine speed signal during a transient state, and the sensor-based rate of change of power turbine speed signal drives the estimated rate of change of power turbine speed signal in steady state.

14. The method of claim 9, wherein generating, by the dynamic inversion power turbine governor module, the torque request signal further comprises:

determining, by the dynamic inversion power turbine governor module, a torque request correction signal based on the difference between the desired rate of change of power turbine speed error signal and the estimated rate of change of power turbine speed signal; and combining, by the dynamic inversion power turbine governor module, the torque request correction signal and the torque achieved signal.

\* \* \* \* \*